US009302676B2

(12) United States Patent
Nagara et al.

(10) Patent No.: US 9,302,676 B2
(45) Date of Patent: Apr. 5, 2016

(54) METHODS AND SYSTEMS FOR SIMULATING A SMART DEVICE USER INTERFACE ON A VEHICLE HEAD UNIT

(71) Applicant: VISTEON GLOBAL TECHNOLOGIES, INC., Van Buren Township, MI (US)

(72) Inventors: Wes A. Nagara, Commerce Township, MI (US); Theodore C. Wingrove, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 79 days.

(21) Appl. No.: 14/022,194

(22) Filed: Sep. 9, 2013

(65) Prior Publication Data

US 2015/0073651 A1    Mar. 12, 2015

(51) Int. Cl.
| | |
|---|---|
| *B60W 50/08* | (2012.01) |
| *B60K 37/02* | (2006.01) |
| *G06F 3/03* | (2006.01) |
| *B60K 35/00* | (2006.01) |
| *B60K 37/06* | (2006.01) |

(52) U.S. Cl.
CPC .............. *B60W 50/08* (2013.01); *B60K 35/00* (2013.01); *B60K 37/02* (2013.01); *B60K 37/06* (2013.01); *G06F 3/03* (2013.01); *B60K 2350/1028* (2013.01); *B60K 2350/352* (2013.01); *B60K 2350/357* (2013.01)

(58) Field of Classification Search
None
See application file for complete search history.

(56) References Cited

U.S. PATENT DOCUMENTS

| | | | |
|---|---|---|---|
| 6,032,089 A | 2/2000 | Buckley | |
| 6,246,935 B1 | 6/2001 | Buckley | |
| 8,126,435 B2 | 2/2012 | George | |
| 8,548,532 B1 * | 10/2013 | Ng ............................. | 455/569.1 |
| 2004/0034455 A1 | 2/2004 | Simonds et al. | |
| 2004/0090121 A1 | 5/2004 | Simonds et al. | |
| 2004/0090346 A1 | 5/2004 | Simonds et al. | |
| 2004/0092253 A1 | 5/2004 | Simonds et al. | |
| 2004/0093154 A1 | 5/2004 | Simonds et al. | |
| 2004/0093155 A1 | 5/2004 | Simonds et al. | |
| 2006/0034222 A1 | 2/2006 | Chennikara-Varghese et al. | |
| 2006/0181963 A1 | 8/2006 | Clayton et al. | |
| 2007/0123191 A1 | 5/2007 | Simpson | |
| 2007/0135087 A1 | 6/2007 | Villevieille et al. | |
| 2007/0142024 A1 | 6/2007 | Clayton et al. | |
| 2007/0143798 A1 * | 6/2007 | Jira et al. ........................ | 725/62 |
| 2010/0260350 A1 * | 10/2010 | Chutorash et al. .............. | 381/86 |
| 2011/0128446 A1 * | 6/2011 | Woo ................................ | 348/552 |
| 2011/0227843 A1 * | 9/2011 | Wang ............................. | 345/173 |
| 2011/0257973 A1 * | 10/2011 | Chutorash et al. ............ | 704/235 |
| 2011/0263293 A1 * | 10/2011 | Blake et al. ................... | 455/557 |

(Continued)

*Primary Examiner* — Rami Khatib
*Assistant Examiner* — Navid Ziaeianmehdizadeh
(74) *Attorney, Agent, or Firm* — Klintworth & Rozenblat IP LLC

(57) ABSTRACT

Methods and systems consistent with the present invention provide an improved system that simulates a smart device user interface on a vehicle head unit. The method comprises the steps of storing a plurality of user interfaces, wherein each of the plurality of user interfaces is affiliated with a platform, and determining if a smart device matches one of the plurality of platforms. If it is determined that the smart device matches one of the plurality of platforms, the method further comprises the steps of retrieving the user interface affiliated with the matched platform, and using the matched user interface on the vehicle head unit.

15 Claims, 8 Drawing Sheets

(56) References Cited

U.S. PATENT DOCUMENTS

| | | |
|---|---|---|
| 2011/0294490 A1 | 12/2011 | Faenger |
| 2011/0298808 A1* | 12/2011 | Rovik ........................... 345/473 |
| 2012/0065815 A1* | 3/2012 | Hess ............................... 701/2 |
| 2012/0096404 A1* | 4/2012 | Matsumoto et al. .......... 715/822 |
| 2012/0176872 A1 | 7/2012 | Waites |
| 2013/0045677 A1 | 2/2013 | Chien |
| 2013/0059538 A1 | 3/2013 | King, II |
| 2013/0106750 A1* | 5/2013 | Kurosawa ..................... 345/173 |

* cited by examiner

METHODS AND SYSTEMS FOR SIMULATING A SMART DEVICE USER INTERFACE ON A VEHICLE HEAD UNIT

FIELD OF THE INVENTION

The present invention relates generally to methods and systems for providing a user-friendly interface on a vehicle head unit, and more particularly to methods and systems for simulating a smart device user interface on a vehicle head unit.

BACKGROUND OF THE INVENTION

Currently, people are able to use their various smart devices, such as tablet computers, cell phones and other portable media players, through their automobile stereo systems. However, the user interface on the car's stereo system does not match the user interface on the user's smart device. Accordingly, the user has to become accustomed to a new and different user interface, which can be time consuming and frustrating. If, for example, a user wants to change a soundtrack while driving, it is helpful for the user to see a familiar user interface that is easy to use without diverting the user's attention significantly from the road. Accordingly, there is a need for an automobile sound system that is able to identify the smart device that is being paired with the car stereo system, and to provide a tailored user interface that matches the interface on the user's smart device.

SUMMARY OF THE INVENTION

Methods and systems consistent with the present invention provide an improved system that simulates a smart device user interface on a vehicle head unit. The look, feel, flow and functionality of a user's smart device are integrated into the head unit. If the user has an iPhone, then the head unit functions similar to the operating system of the iPhone. If the user has an Android, then the head unit functions similar to an Android user interface. Most smart device users spend a substantial amount of time becoming familiar with the smart device user interface. Because they already are familiar with the smart device user interface, they do not want nor have the time to learn how to use a different user interface on their vehicle head unit.

In accordance with methods and systems consistent with the present invention, a method is provided for simulating a smart device user interface on a vehicle head unit. The method comprises the steps of storing a plurality of user interfaces, where each of the plurality of user interfaces is affiliated with a platform, detecting a smart device, and determining if the smart device matches one of the plurality of platforms. If it is determined that the smart device matches one of the plurality of platforms, the method further comprises the steps of identifying a user of the smart device, and determining if the user is authorized. If it is determined that the user is authorized, the method further comprises the steps of retrieving the user interface affiliated with the matched platform, displaying an avatar from the matched user interface, and determining if the avatar is selected. If it is determined that the avatar is selected, the method further comprises the step of using the matched user interface on the vehicle head unit.

In accordance with methods and systems consistent with another embodiment of the present invention, a method is provided for simulating a smart device user interface on a vehicle head unit. The method comprises the steps of storing a plurality of user interfaces, wherein each of the plurality of user interfaces is affiliated with a platform, and determining if a smart device matches one of the plurality of platforms. If it is determined that the smart device matches one of the plurality of platforms, the method further comprises the steps of identifying a user of the smart device, and determining if the user is authorized. If it is determined that the user is authorized, the method further comprises the steps of retrieving the user interface affiliated with the matched platform, and using the matched user interface on the vehicle head unit.

In accordance with methods and systems consistent with a further embodiment of the present invention, a method is provided for simulating a smart device user interface on a vehicle head unit. The method comprises the steps of storing a plurality of user interfaces, wherein each of the plurality of user interfaces is affiliated with a platform, and determining if a smart device matches one of the plurality of platforms. If it is determined that the smart device matches one of the plurality of platforms, the method further comprises the steps of retrieving the user interface affiliated with the matched platform, and using the matched user interface on the vehicle head unit.

In accordance with articles of manufacture consistent with the present invention, a computer-readable medium is provided. The computer-readable medium contains instructions for controlling a data processing system to simulate a smart device user interface on a vehicle head unit. The method comprises the steps of storing a plurality of user interfaces, wherein each of the plurality of user interfaces is affiliated with a platform, and determining if a smart device matches one of the plurality of platforms. If it is determined that the smart device matches one of the plurality of platforms, the method further comprises the steps of identifying a user of the smart device, and determining if the user is authorized. If it is determined that the user is authorized, the method further comprises the steps of retrieving the user interface affiliated with the matched platform, and using the matched user interface on the vehicle head unit.

In accordance with articles of manufacture consistent with another embodiment of the present invention, a computer-readable medium is provided. The computer-readable medium contains instructions for controlling a data processing system to simulate a smart device user interface on a vehicle head unit. The method comprises the steps of storing a plurality of user interfaces, wherein each of the plurality of user interfaces is affiliated with a platform, and determining if a smart device matches one of the plurality of platforms. If it is determined that the smart device matches one of the plurality of platforms, the method further comprises the steps of retrieving the user interface affiliated with the matched platform, and using the matched user interface on the vehicle head unit.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

Figure 1:
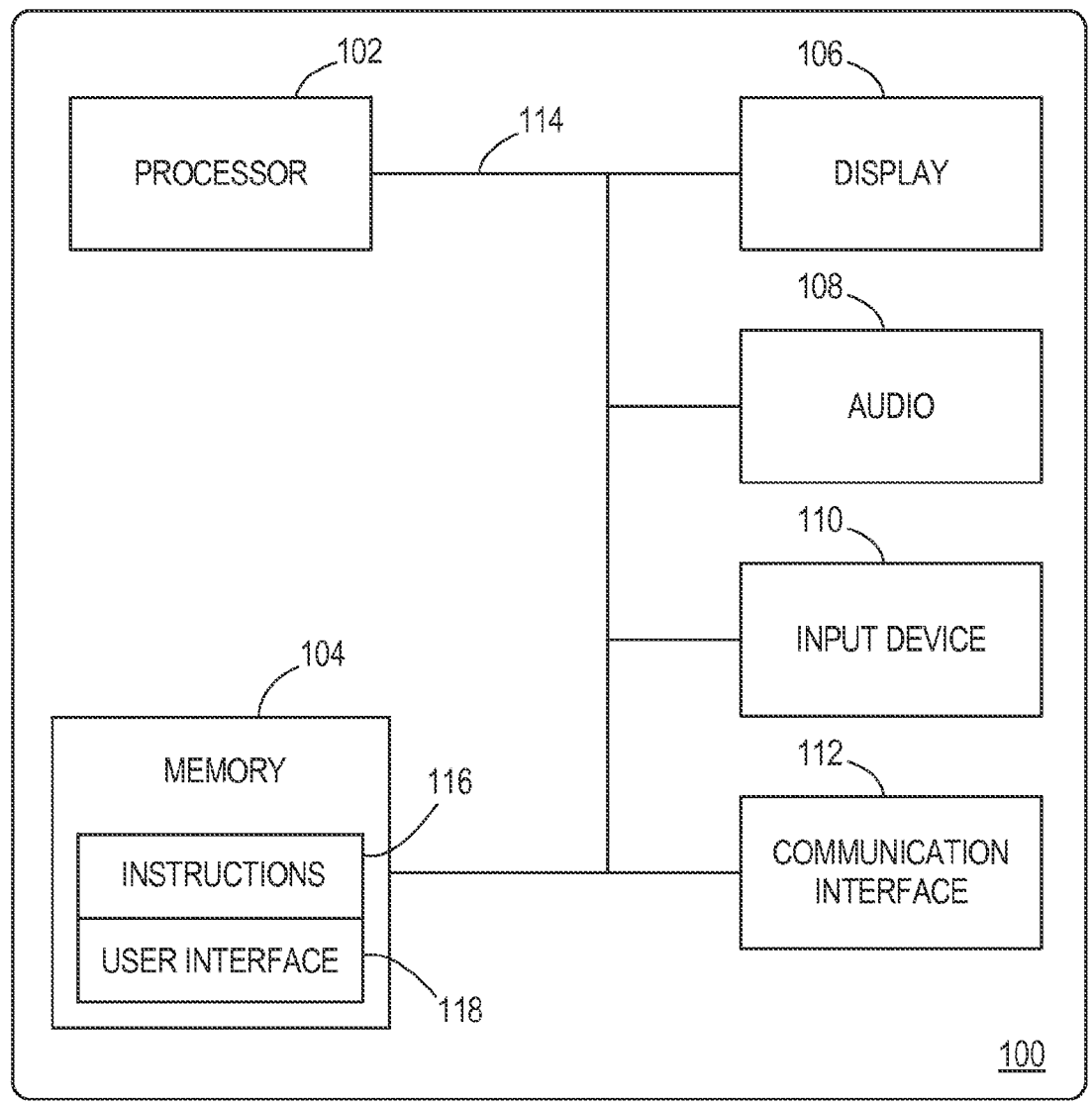
FIG. 1 depicts a data processing system suitable for implementing methods and systems for simulating a smart device user interface on a vehicle head unit consistent with the present invention.

Reference will now be made in detail to the description of the invention as illustrated in the drawings. While the invention will be described in connection with these drawings, there is no intent to limit it to the embodiment(s) disclosed. On the contrary, the intent is to cover all alternatives, modifications, and equivalents included within the spirit and scope of the invention as defined by the appended claims.

DETAILED DESCRIPTION OF THE INVENTION

FIG. 1 depicts an exemplary data processing system 100 for the vehicle head unit suitable for practicing methods and systems consistent with the present invention. Data processing system 100 includes a processor 102, memory 104, a display 106, an audio output 108, and input device 110, and a communication interface 112. These internal components exchange information with one another via a system bus 114. Data processing system 100 communicates with smart phone devices through communication interface 112. The components are standard in most data processing systems consistent with the present invention.

Although data processing system 100 contains a single processor, it will be apparent to those skilled in the art that methods consistent with the present invention operate equally as well with a multi-processor environment.

Memory 104 includes instructions 116 that may be executed to cause the data processing system 100 to perform any one or more of the methods or functions disclosed herein. The data processing system 100 may operate as a standalone device or may be connected, e.g., using a network, to other computer systems or peripheral devices. Memory 104 also includes a set of icons to simulate the user interface 118 for each platform stored in the system. For example, the system 100 may include a set of icons to simulate the user interface for an iPhone platform. System 100 also may include a set of icons to simulate the user interface for an Android platform. Although described in terms of the iPhone or Android platforms, one having skill in the art will appreciate that the present invention may store various user interfaces for other smart device platforms. Although the user interfaces may be downloaded from the smart phone device, to avoid the time required to download the graphics and the memory required to store unnecessary graphics from the smart device, a preferred embodiment consistent with the present invention has a set of icons for various smart device platforms already stored in the vehicle head unit memory 104.

Figure 2B:
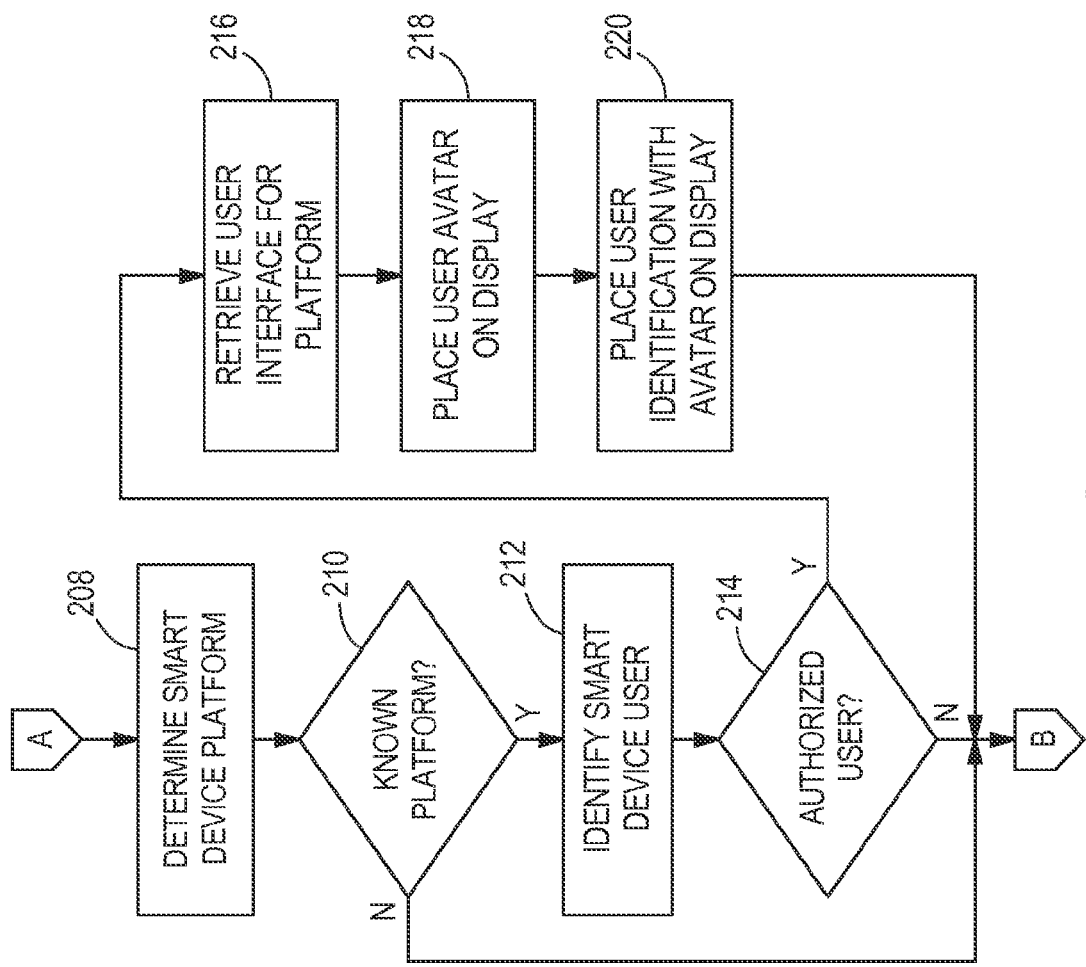
FIG. 2A-C depict a flow diagram illustrating the steps performed by the data processing system depicted in FIG. 1, in accordance with methods and systems consistent with the present invention.
Figure 2A:
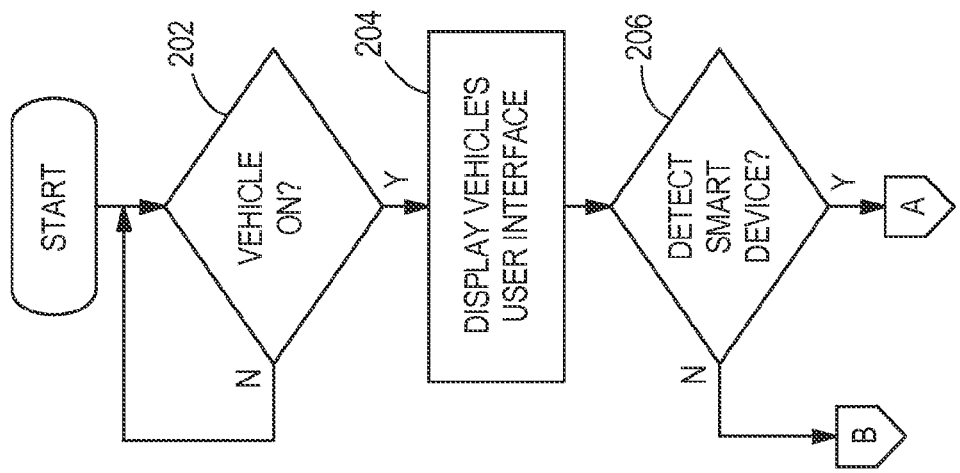
Figure 2C:
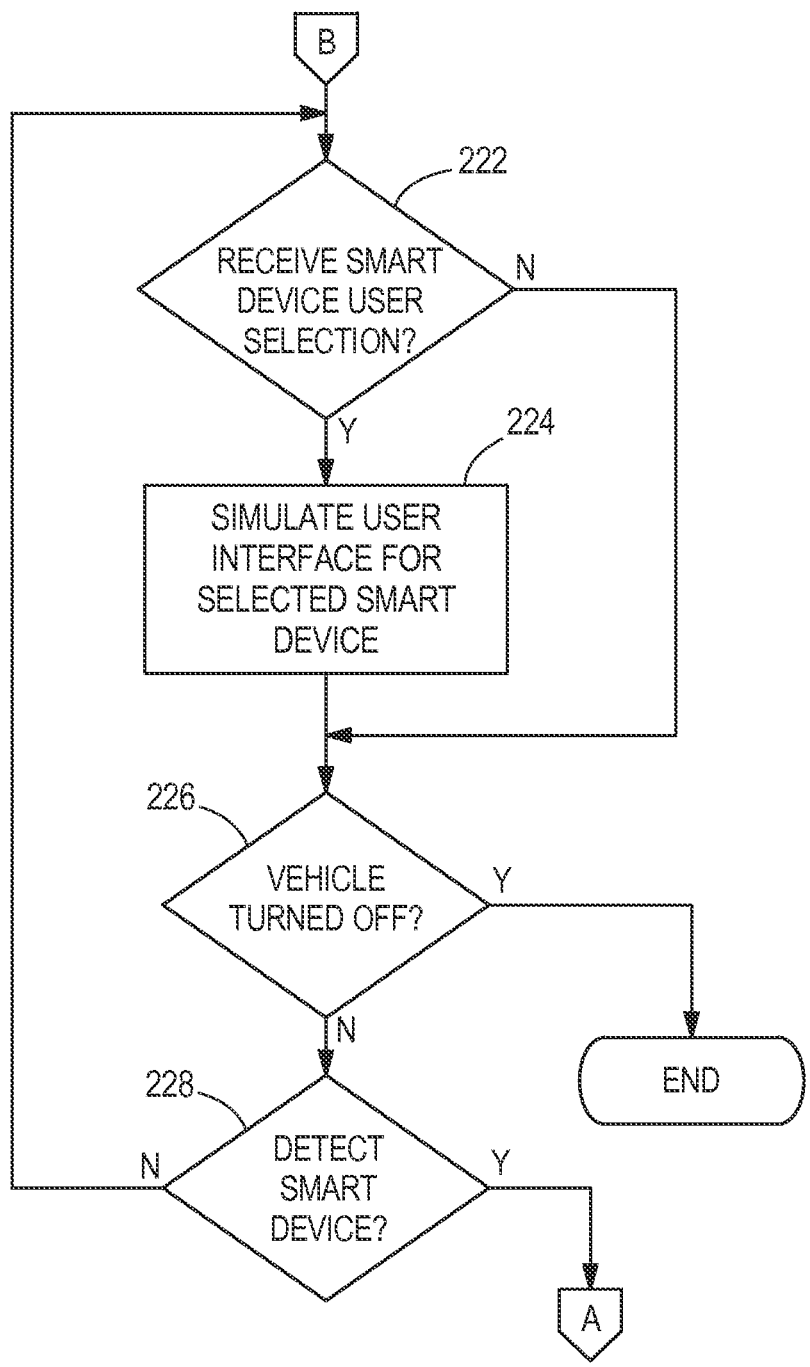
Figure 3:
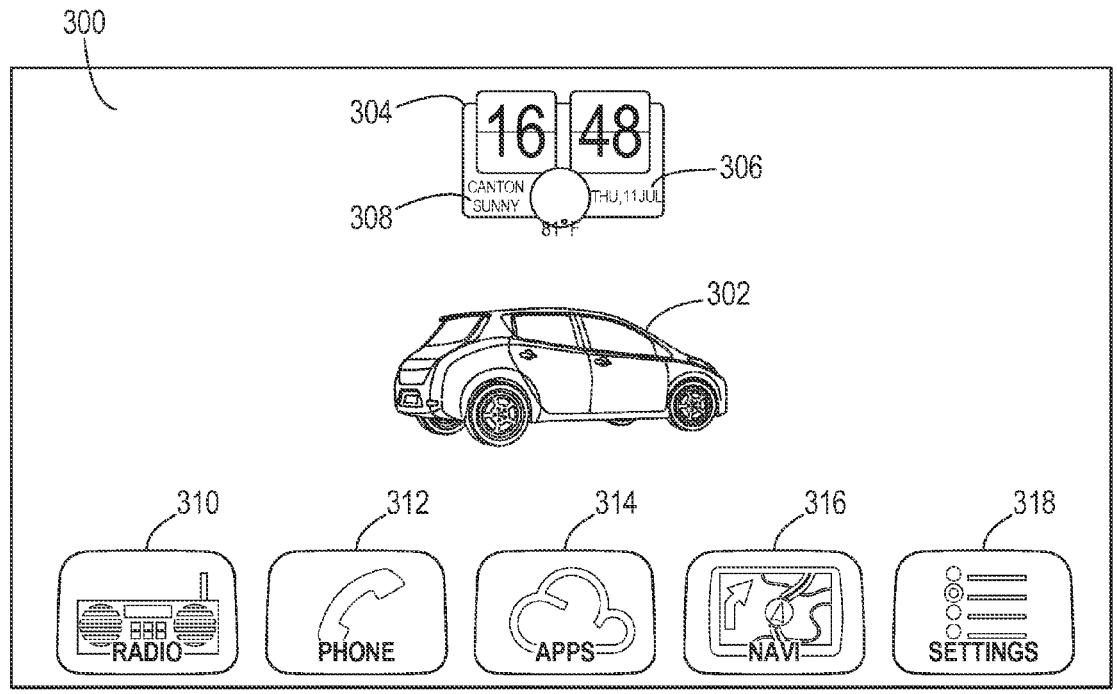
FIG. 3 depicts an exemplary vehicle head unit user interface.

The flow chart of FIG. 2A-C provides additional details regarding the operation of a vehicle head unit data processing system 100 consistent with an implementation of the present invention. The system initially determines if the vehicle has been turned on (step 202). After the vehicle has been turned on, the system displays the vehicle's standard user interface (step 204). FIG. 3 depicts an example of a standard user interface 300 on a vehicle head unit. The user interface 300 displays a vehicle 302 to indicate that the user interface 300 is the standard user interface for the vehicle. The user interface 300 also displays the time 304, the date 306 and the weather 308. The user interface 300 also includes a radio button 310, a phone button 312, an applications button 314, a navigation button 316 and a settings button 318.

Figure 4:
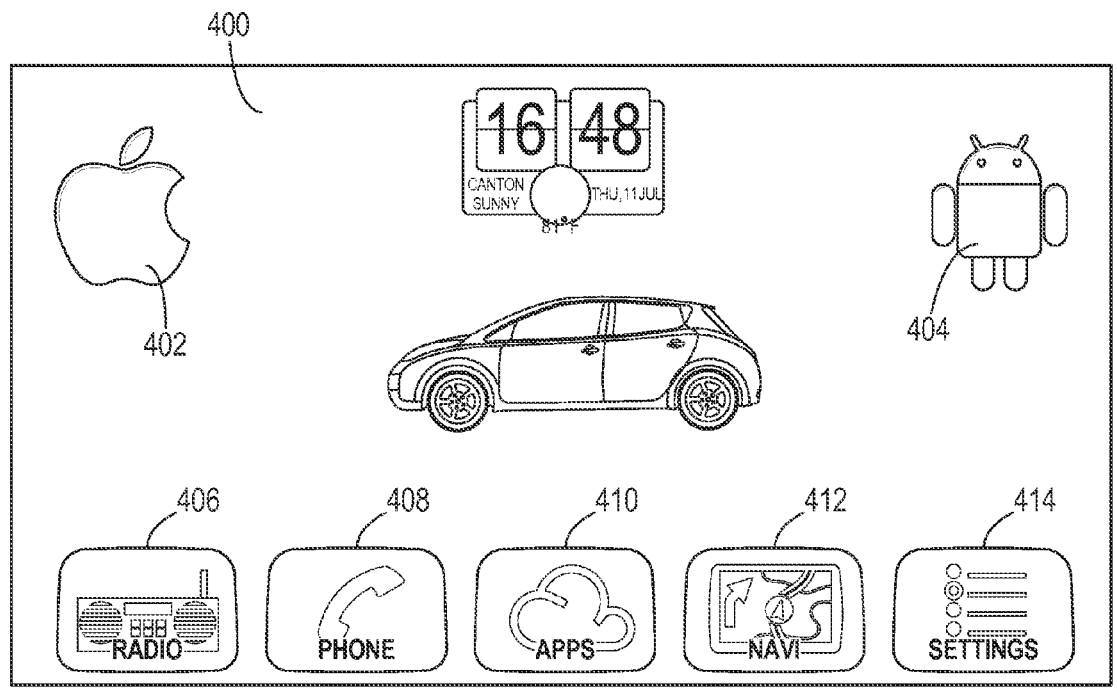
FIG. 4 depicts an exemplary vehicle head unit user interface that includes avatars to selectively display a simulation of a smart device user interface consistent with the present invention.

Returning to the process of FIG. 2A, after displaying the vehicle's standard user interface, the system determines if it detects a smart device within the vehicle (step 206). If the system detects a smart device, it determines the smart device's platform (step 208, FIG. 2B). For example, the smart device platform could be an iPhone or an Android. The system then determines if the device's platform is a known platform (step 210). In other words, the system determines if a set of user interfaces for the device's platform is stored in memory 104. If the device's platform is a known platform, the system identifies the smart device user (step 212), and determines if the user is an authorized user (step 214). If the system determines that the user is an authorized user, it retrieves the user interface for the platform from memory 104 (step 216) and places the user avatar on the display (step 218). For example, FIG. 4 depicts the vehicle user interface of FIG. 3 with an iPhone avatar 402 and an Android avatar 404. Although depicted with two avatars, one having skill in the art will appreciate that the system may detect and display only one smart device, or it may detect and display any number of smart devices. The system also may include the identity of the user (not depicted) with the avatar (step 220). For example, the user's name may be included with the avatar, or a user-specific avatar may be displayed.

After placing the avatar on the display, the system determines if it a smart device was selected on the display (step 222, FIG. 2C). The system also performs this step if it determines that the device's platform is not a known platform at step 210 or if it determines that the user is not an authorized user at step 214.

If, at step 222, the system determines that a smart device was selected, it simulates the user interface for the selected smart device on the head unit display (step 224). The system then checks to make sure the vehicle is still turned on (step 226). If the vehicle has been turned off, the process ends. Alternatively, the vehicle head unit may include a delayed accessory so that the head unit will remain active for a period of time after the vehicle has been turned off. In a preferred embodiment, the head unit will become inactive after approximately 10 minutes in order to ensure the battery is not drained. If the vehicle is still turned on at step 226, the system determines whether it detects another smart device (step 228). If it detects another smart device, it returns to step 208 in FIG. 2B to determine the smart device platform. Otherwise, it returns to step 222 to determine if another smart device has been selected.

Figure 5:
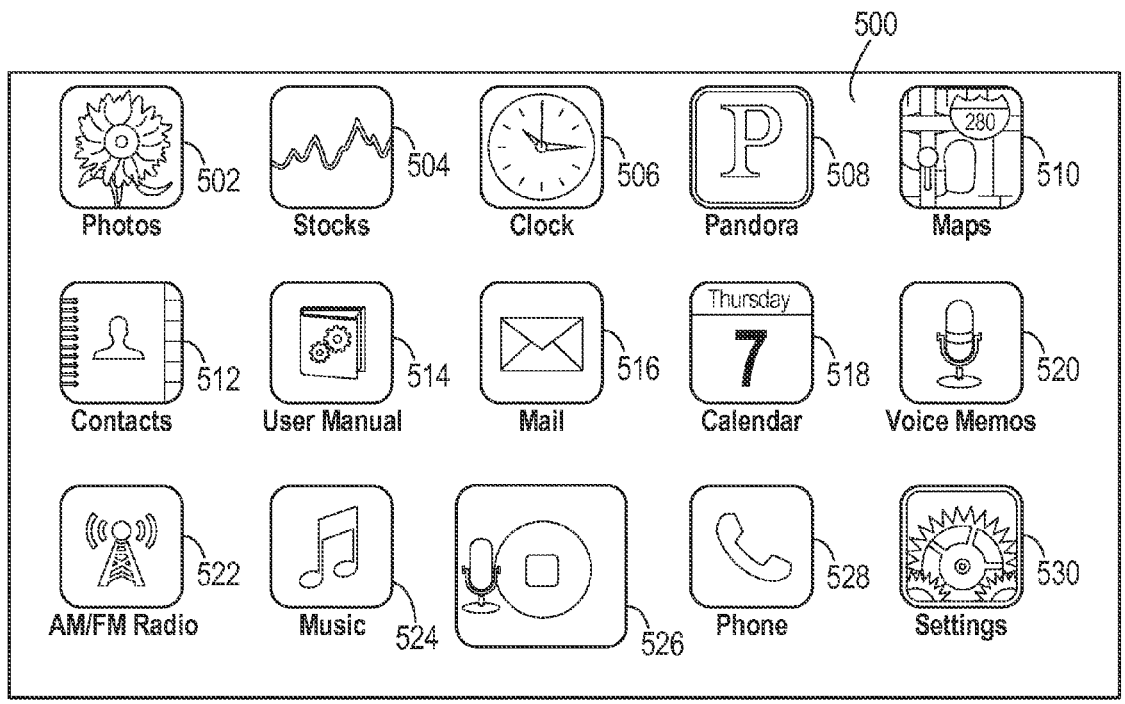
FIGS. 5-12 depict exemplary simulations of smart device user interfaces consistent with the present invention.

FIG. 5 depicts one embodiment of a user interface 500 consistent with the present invention for an iPhone-based smart device. User interface 500 includes icons for photos 502, stocks 504, a clock 506, Pandora 508, maps 510, contacts 512, a user manual 514, mail 516, a calendar 518, voice memos 520, a radio 522, music 524, a home button 526, phone 528 and settings 530.

Figure 6:
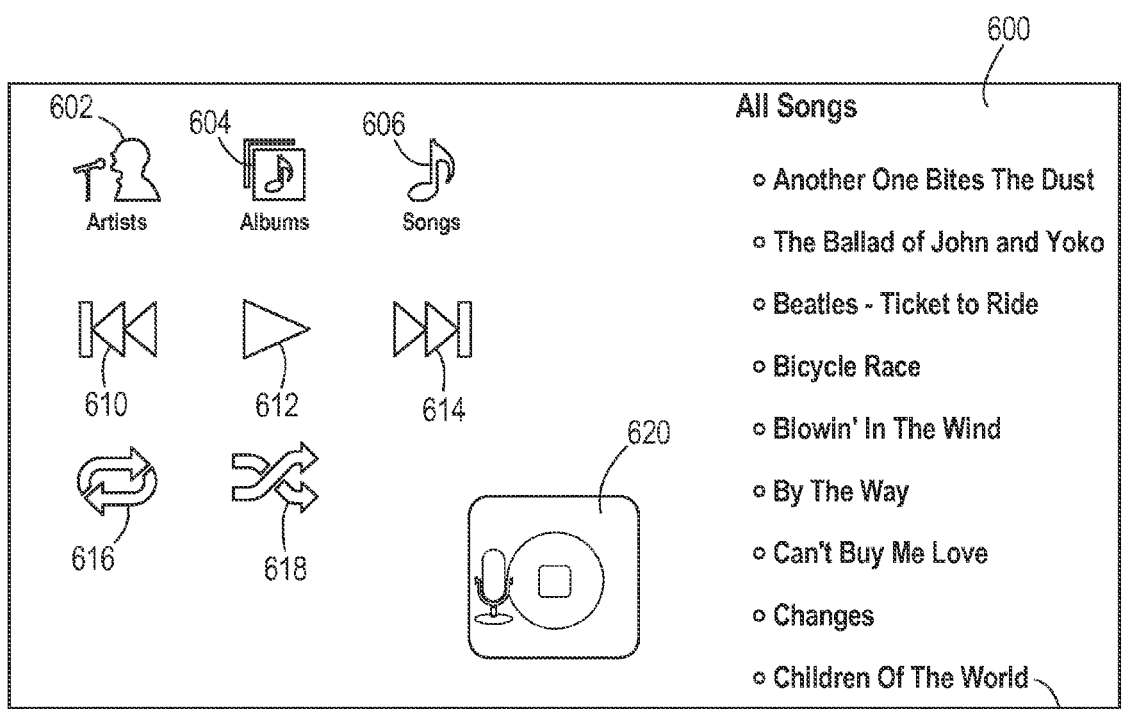

FIG. 6 depicts another embodiment of a user interface 600 consistent with the present invention for an iPhone-based smart device. User interface 600 would be displayed if one were to select the music icon 524 on the user interface 500 of FIG. 5. User interface 600 includes icons to list songs by artists 602, albums 604 or songs 606. User interface 600 also illustrates that all songs on the smart device may be listed alphabetically 608. User interface 600 includes icons to repeat 610, play 612 or skip 614 a song. User interface also includes icons to play the music in order 616 or to shuffle 618 the songs, and includes a home button 620 to return to the main screen.

Figure 7:
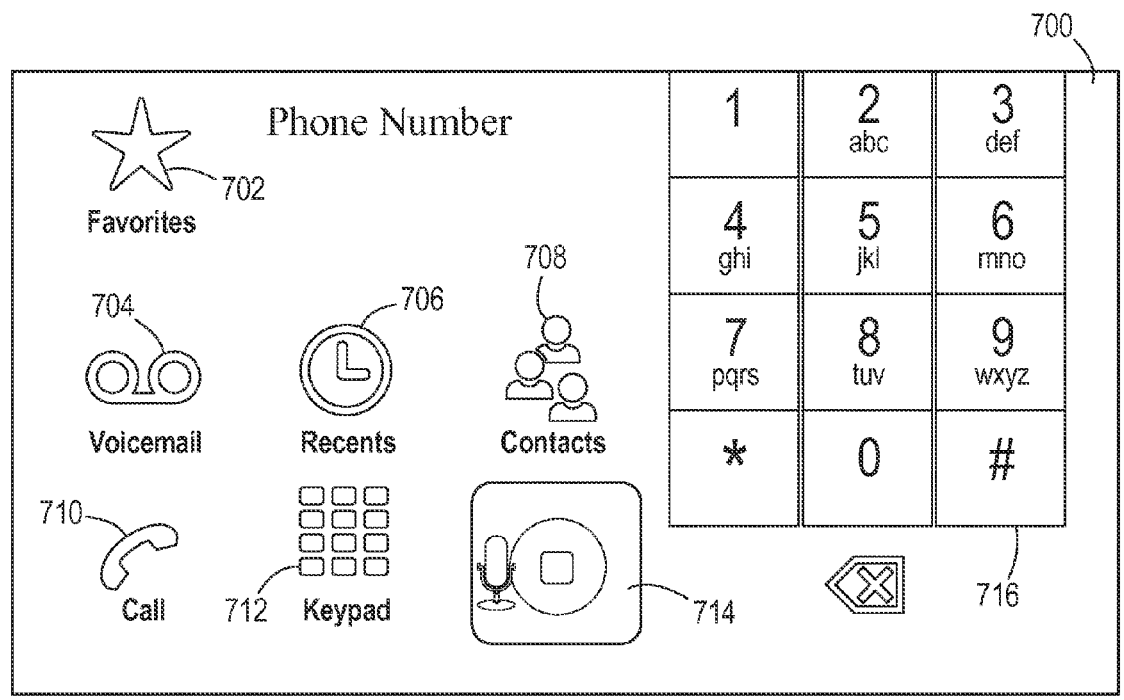

FIG. 7 depicts a further embodiment of a user interface 700 consistent with the present invention for an iPhone-based smart device. User interface 700 would be displayed if one were to select the phone icon 528 on the user interface 500 of FIG. 5. User interface 700 includes icons for frequently called numbers 702, voicemail 704, recently dialed numbers 706, a contact list 708, a call button 710, a keypad 712 and a home button 714 to return to the main screen. User interface 700 also depicts a keypad 716, which is displayed if one were to select the keypad icon 712.

Figure 8:
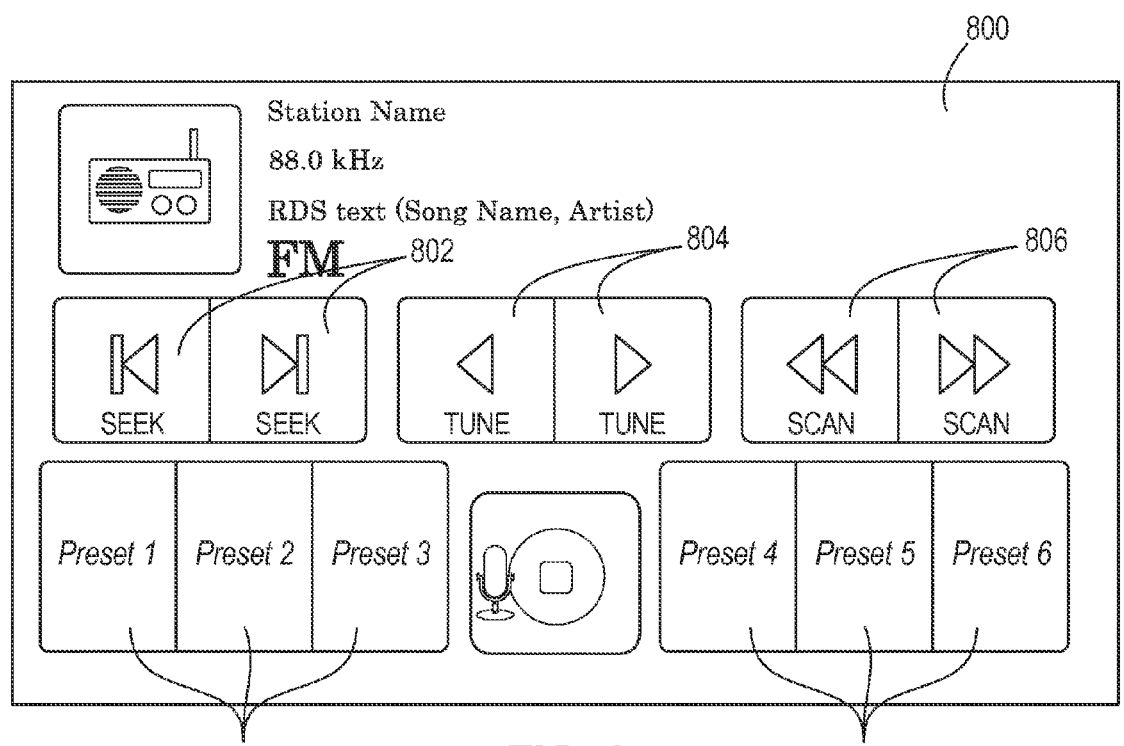

FIG. 8 depicts yet another embodiment of a user interface 800 consistent with the present invention for an iPhone-based smart device. User interface 800 would be displayed if one were to select the radio icon 522 on the user interface 500 of FIG. 5. User interface 800 includes icons to seek 802, tune 804 and scan 806 for radio stations. User interface 800 also includes a number of present buttons 808.

Figure 9:
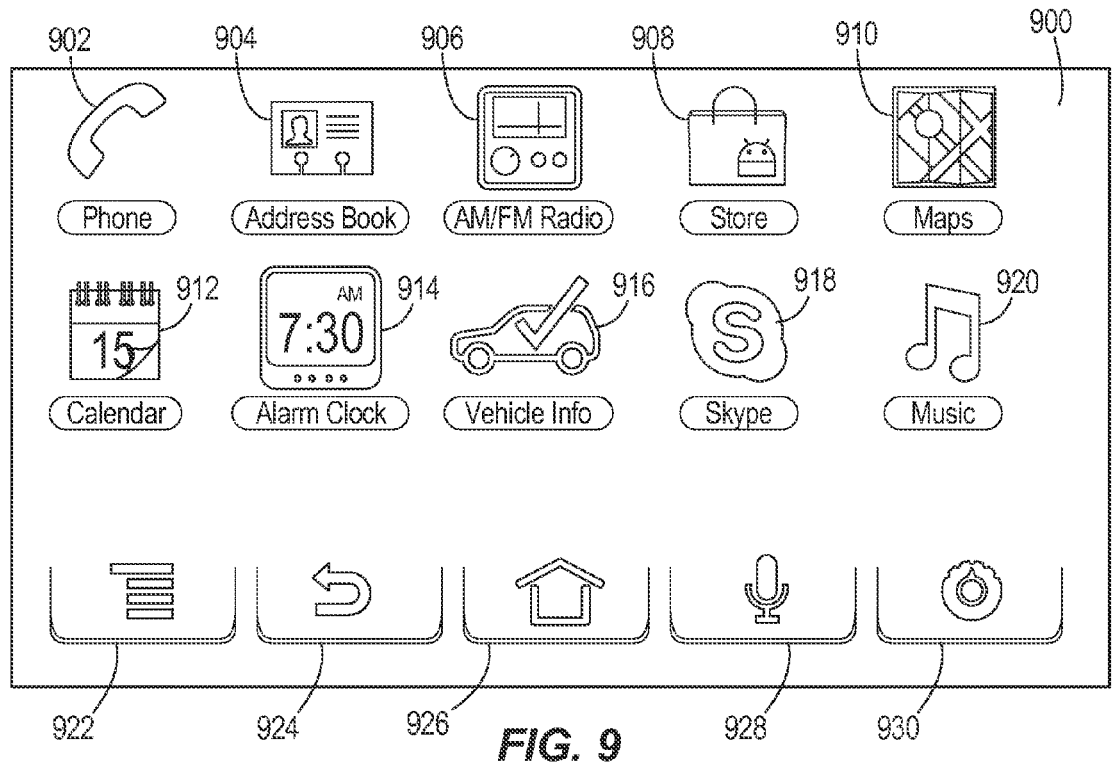

FIG. 9 depicts one embodiment of a user interface 900 consistent with the present invention for an Android-based smart device. User interface 900 includes icons for a phone 902, an address book 904, a radio 906, an Android store 908, maps 910, a calendar 912, an alarm clock 914, vehicle info 916, Skype 918 and music 920. User Interface 900 also includes icons for menu 922, back 924, home 926, voice 928, and settings 930. Interfaces 922 through 930 could represent smart device buttons or vehicle global preset buttons, and can be soft or mechanical.

Figure 10:
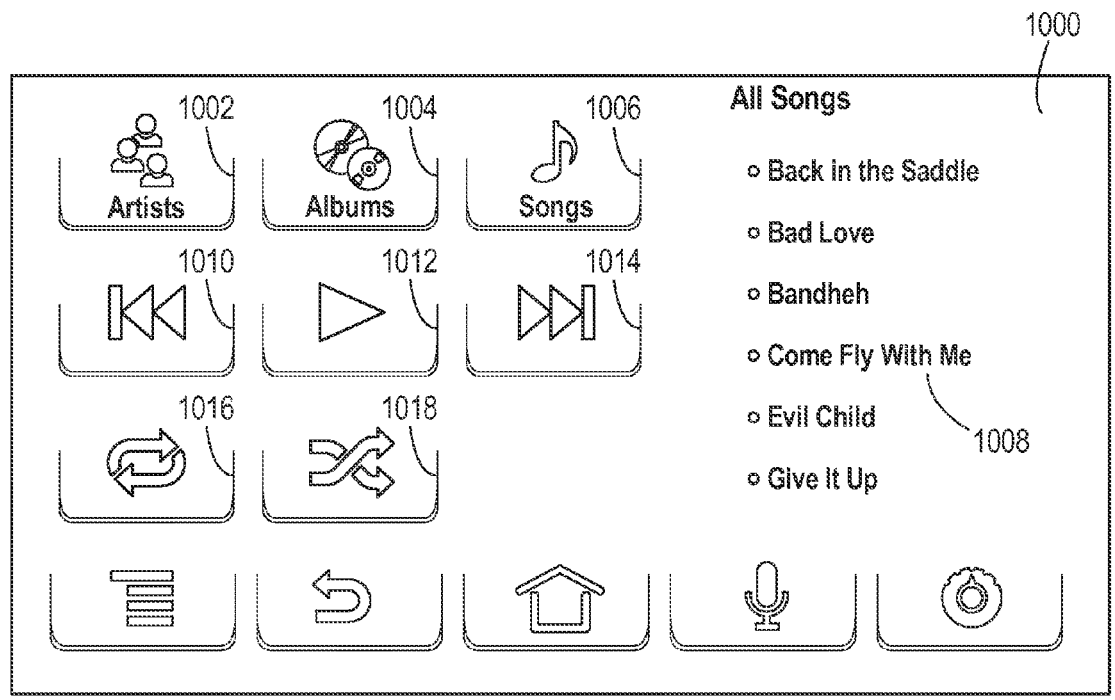

FIG. 10 depicts another embodiment of a user interface 1000 consistent with the present invention for an Android-based smart device. User interface 1000 would be displayed if one were to select the music icon 920 on the user interface 900 of FIG. 9. User interface 1000 includes icons to list songs by artists 1002, albums 1004 or songs 1006. User interface 1000 also illustrates that all songs on the smart device may be listed alphabetically 1008. User interface 1000 includes icons to repeat 1010, play 1012 or skip 1014 a song. User interface 1000 also includes icons to play the music in order 1016 or to shuffle 1018 the songs.

Figure 11:
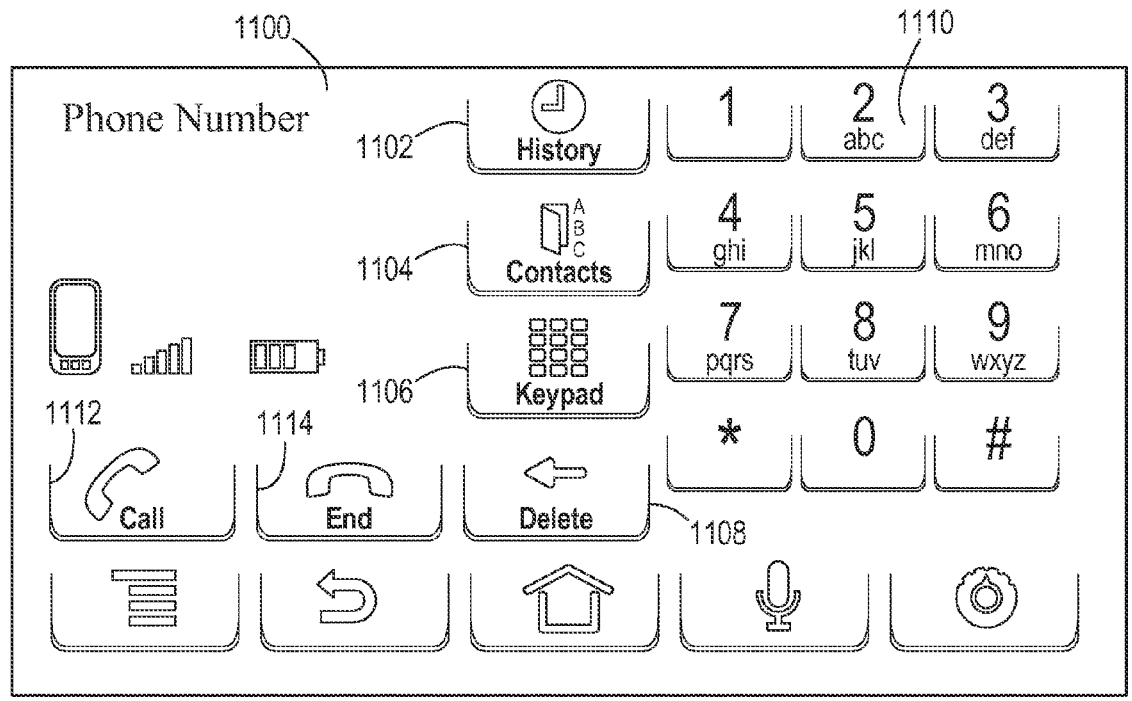

FIG. 11 depicts a further embodiment of a user interface 1100 consistent with the present invention for an Android-based smart device. User interface 1100 would be displayed if one were to select the phone icon 902 on the user interface 900 of FIG. 9. User interface 1100 includes icons for recently dialed and received numbers 1102, a contact list 1104, a keypad 1106 and a delete button 1108. User interface 1100 also depicts a keypad 1110, which is displayed if one were to select the keypad icon 1106. User interface 1100 also includes a call 1112 and end 1114 icons.

Figure 12:
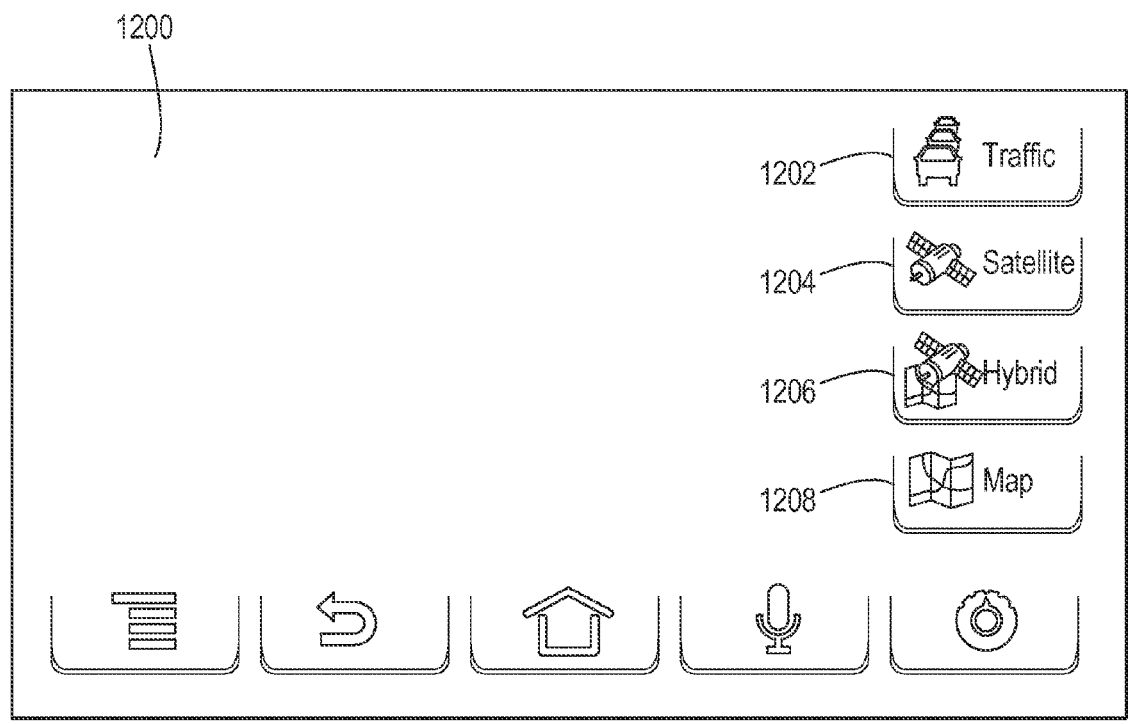

FIG. 12 depicts yet another embodiment of a user interface 1200 consistent with the present invention for an Android-based smart device. User interface 1200 would be displayed if one were to select the map icon 910 on the user interface 900 of FIG. 9. User interface 1200 includes icons for traffic 1202, satellite 1204, hybrid 1206 and a map 1208.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for simulating a smart device user interface on a vehicle head unit, the method comprising the steps of: storing a plurality of user interfaces in at least one memory of a vehicle, wherein each of the plurality of user interfaces is affiliated with a respective platform; detecting a first smart device and a second smart device in the vehicle; determining if the first smart device and the second smart device in the vehicle match the respective platforms; after it is determined that the first smart device and the second smart device in the vehicle match the respective platforms, identifying a first user of the first smart device and a second user of the second smart device; determining if the first user and the second user are authorized; after it is determined that the first user and the second user are authorized, retrieving the user interfaces affiliated with the respective matched platforms from the at least one memory; displaying first and second avatars from the user interface affiliated with the respective matched platforms on the vehicle head unit; determining if the first avatar or the second avatar is selected on the vehicle head unit; and after it is determined that the first avatar or the second avatar is selected on the vehicle head unit, using the user interface affiliated with the respective matched platform of the selected first avatar or the selected second avatar on the vehicle head unit to control the first smart device or the second smart device.

2. The method of claim 1, further comprising the step of displaying identifications of the first user and the second user with the first and second avatars on the vehicle head unit.

3. The method of claim 1, further comprising the step of displaying a vehicle user interface on the vehicle head unit before determining if the first smart device and the second smart device in the vehicle match the respective platforms.

4. A method for simulating a smart device user interface on a vehicle head unit, the method comprising the steps of: storing a plurality of user interfaces in at least one memory of a vehicle, wherein each of the plurality of user interfaces is affiliated with a respective platform; determining if a first smart device or a second smart device in the vehicle match the respective platforms; after it is determined that the first smart device and the second smart device in the vehicle match the respective platforms, displaying first and second avatars on the vehicle head unit to allow control of the first smart device or the second smart device; after the first or the second avatar is selected, retrieving the user interface affiliated with the respective matched platform from the at least one memory; and after the first or the second avatar is selected, using the user interface affiliated with the respective matched platform on the vehicle head unit to control the first smart device or the second smart device.

5. The method of claim 4, further comprising the step of detecting the first smart device and the second smart device in the vehicle before determining if the first smart device and the second smart device match the respective one of the plurality of platforms.

6. The method of claim 4, further comprising the step of displaying a vehicle user interface on the vehicle head unit before determining if the first smart device and the second smart device in the vehicle match the respective platforms.

7. The method of claim 4, wherein the displaying the first and second avatars on the vehicle head unit to allow control of the first smart device or the second smart device further comprises displaying identifications of first and second users on the vehicle head unit.

8. A non-transitory computer-readable medium containing instructions for controlling a data processing system to simulate a smart device user interface on a vehicle head unit, the method comprising the steps of: storing a plurality of user interfaces in at least one memory of a vehicle, wherein each of the plurality of user interfaces is affiliated with a respective platform; determining if a first smart device and a second smart device in the vehicle match the respective platforms; after it is determined that the first smart device and the second smart device in the vehicle match the respective platforms, identifying a first user of the first smart device and a second user of the second smart device; determining if the first user and the second user are authorized; after it is determined that the first user and the second user are authorized, displaying first and second avatars on the vehicle head unit to allow control of the first smart device or the second smart device; after the first or the second avatar is selected, retrieving the user interface affiliated with the respective matched platform from the at least one memory; and after the first or the second avatar is selected, using the user interface affiliated with the respective matched platform on the vehicle head unit to control the first smart device or the second smart device.

9. The non-transitory computer-readable medium of claim 8, wherein the method further comprises the step of detecting the first smart device and the second smart device in the vehicle before determining if the first smart device and the second smart device match the respective platforms.

10. The non-transitory computer-readable medium of claim 8, wherein the method further comprises the step of displaying a vehicle user interface on the vehicle head unit before determining if the first smart device and the second smart device in the vehicle match the respective platforms.

11. The non-transitory computer-readable medium of claim 8, wherein the displaying the first and second avatars on the vehicle head unit to allow control of the first smart device or the second smart device further comprises displaying identifications of the first and second users on the vehicle head unit.

12. A non-transitory computer-readable medium containing instructions for controlling a data processing system to simulate a smart device user interface on a vehicle head unit, the method comprising the steps of: storing a plurality of user interfaces in at least one memory of a vehicle, wherein each of the plurality of user interfaces is affiliated with a respective platform; determining if a first smart device and a second smart device in the vehicle match the respective platforms; after it is determined that the first smart device and the second smart device in the vehicle match the respective platforms, displaying first and second avatars on the vehicle head unit to allow control of the first smart device or the second smart device; after the first avatar or the second avatar is selected, retrieving the user interface affiliated with the respective matched platform from the at least one memory; and after the first avatar or the second avatar is selected, using the user interface affiliated with the respective matched platform on the vehicle head unit to control the first smart device or the second smart device.

13. The non-transitory computer-readable medium of claim 12, wherein the method further comprises the step of detecting the first and second smart devices in the vehicle before determining if the first and second smart devices match the respective platforms.

14. The non-transitory computer-readable medium of claim 12, wherein the method further comprises the step of displaying a vehicle user interface on the vehicle head unit before determining if the first and second smart devices in the vehicle match the respective platforms.

15. The non-transitory computer-readable medium of claim 12, wherein the displaying the first and second avatars on the vehicle head unit to allow control of the first smart device or the second smart device further comprises displaying identifications of the first and second users on the vehicle head unit.

* * * * *